US010151927B2

(12) United States Patent
Magpuri et al.

(10) Patent No.: US 10,151,927 B2
(45) Date of Patent: Dec. 11, 2018

(54) VIRTUAL REALITY AND AUGMENTED REALITY HEAD SET FOR RIDE VEHICLE

(71) Applicant: Falcon's Treehouse, LLC, Orlando, FL (US)

(72) Inventors: Cecil Magpuri, Orlando, FL (US); David Consolo, Orlando, FL (US)

(73) Assignee: Falcon's Treehouse, LLC, Orlando, FL (US)

( * ) Notice: Subject to any disclaimer, the term of this patent is extended or adjusted under 35 U.S.C. 154(b) by 0 days.

(21) Appl. No.: 15/594,061

(22) Filed: May 12, 2017

(65) Prior Publication Data

US 2017/0345198 A1 Nov. 30, 2017

Related U.S. Application Data

(60) Provisional application No. 62/343,307, filed on May 31, 2016.

(51) Int. Cl.
| G02B 27/01 | (2006.01) |
| A63G 31/16 | (2006.01) |
| A63G 7/00 | (2006.01) |
| A63G 31/00 | (2006.01) |

(52) U.S. Cl.
CPC ......... *G02B 27/0172* (2013.01); *A63G 31/16* (2013.01); *G02B 27/0176* (2013.01); *A63G 7/00* (2013.01); *A63G 31/00* (2013.01); *G05B 2219/32014* (2013.01)

(58) Field of Classification Search
CPC .......... G06T 11/60; A63G 31/00; A63G 7/00; A63G 31/16; G02B 27/0172; G02B 27/0176; G05B 2219/32014
See application file for complete search history.

(56) References Cited

U.S. PATENT DOCUMENTS

| 5,669,821 | A | * | 9/1997 | Prather | A63G 31/16 104/78 |
| 6,533,670 | B1 | * | 3/2003 | Drobnis | A63G 31/16 434/55 |
| 9,933,624 | B1 | * | 4/2018 | White | G02B 27/0176 |
| 2008/0070709 | A1 | * | 3/2008 | Casey | A63G 4/00 472/88 |
| 2012/0154920 | A1 | * | 6/2012 | Harrison | G02B 3/0056 359/619 |
| 2014/0104692 | A1 | * | 4/2014 | Bickerstaff | G02B 27/017 359/630 |
| 2017/0323482 | A1 | * | 11/2017 | Coup | A63G 7/00 |

\* cited by examiner

*Primary Examiner* — Maurice L. McDowell, Jr.
(74) *Attorney, Agent, or Firm* — Perkins Coie LLP; Kenneth H. Ohriner

(57) ABSTRACT

A method for operating a ride attraction includes moving a ride vehicle along a pathway, with at least one rider in or on the ride vehicle, and with the at least one rider wearing a headset having a display and a window. Virtual images are created on the display based at least in part on a position of the ride vehicle along the pathway, with the at least one rider viewing the virtual images, and with the at least one rider also simultaneously viewing real world images of real world objects through the window. The virtual images may be overlaid onto the real-world images.

5 Claims, 5 Drawing Sheets

VIRTUAL REALITY AND AUGMENTED REALITY HEAD SET FOR RIDE VEHICLE

BACKGROUND OF THE INVENTION

This application claims priority to U.S. Provisional Patent Application No. 62/343,307 filed May 31, 2016 and incorporated herein by reference. The field of the invention is theme park rides and attractions.

In various theme park rides, riders are seated in a vehicle which moves along a pathway having themed elements. The vehicle may move along a track and may optionally include a motion base having actuators to allow the seating platform to move in pitch, roll, yaw, heave, surge, sway, rotation, and similar movements. Combined with inertial forces resulting from the actual movement of the vehicle, the vehicle can provide many different rider sensations. Other types of theme park attractions may have a stationery motion base which also physically moves a rider or audience member, but without movement along a pathway. In these types of attractions, such as motion base theaters, rows of seats are supported on a motion base platform which performs some of the movements listed above. The seats themselves may also be moved independently of the platform, such as in so-called 4-D theaters.

Virtual reality and augmented reality (collectively referred to as VR) generally have a screen or other viewing device on a headset, goggle, visor or helmet, with the screen within a few centimeters of the viewers' eyes. VR viewing devices, collectively referred to here as headsets, have been combined with theme park rides, such as roller coasters, to provide an enhanced rider experience. While these and other VR attractions have met with varying degrees of success, design challenges remain.

SUMMARY OF THE INVENTION

In a first aspect, a method for operating a ride attraction includes moving a ride vehicle along a pathway, with at least one rider in or on the ride vehicle, and with the at least one rider wearing a headset having a display and a window. Virtual images are created on the display based at least in part on a position of the ride vehicle along the pathway, with the at least one rider viewing the virtual images, and with the at least one rider also simultaneously viewing real world images of real world objects through the window. The virtual images may be overlaid onto the real-world images.

In a second aspect, a ride attraction includes a vehicle with an integrated motion base. A VR headset is supported on an armature on the vehicle. A control system synchronizes movement of seats on the vehicle with VR media which riders view on a display in the VR display. The armature allows the viewer to move and turn the VR headset, similar to a conventional VR headset, goggle or helmet, but with the armature substantially supporting the entire weight of the VR headset. The rider can therefore freely look around during the ride. At key moments during the ride, the control system may tell the rider to remove the VR headset. Alternatively, the display may convert to a transparent window allowing the rider to see through the display to view the real environment. With the VR headset removed the rider can view immersive real physical set pieces along the path of the vehicle. During program segments when the VR headsets are in use with VR content viewed on the display, the vehicle may be stopped, or the vehicle may move through un-themed spaces, as in these program segments the program content is viewed entirely via the display.

DETAILED DESCRIPTION

Figure 1:
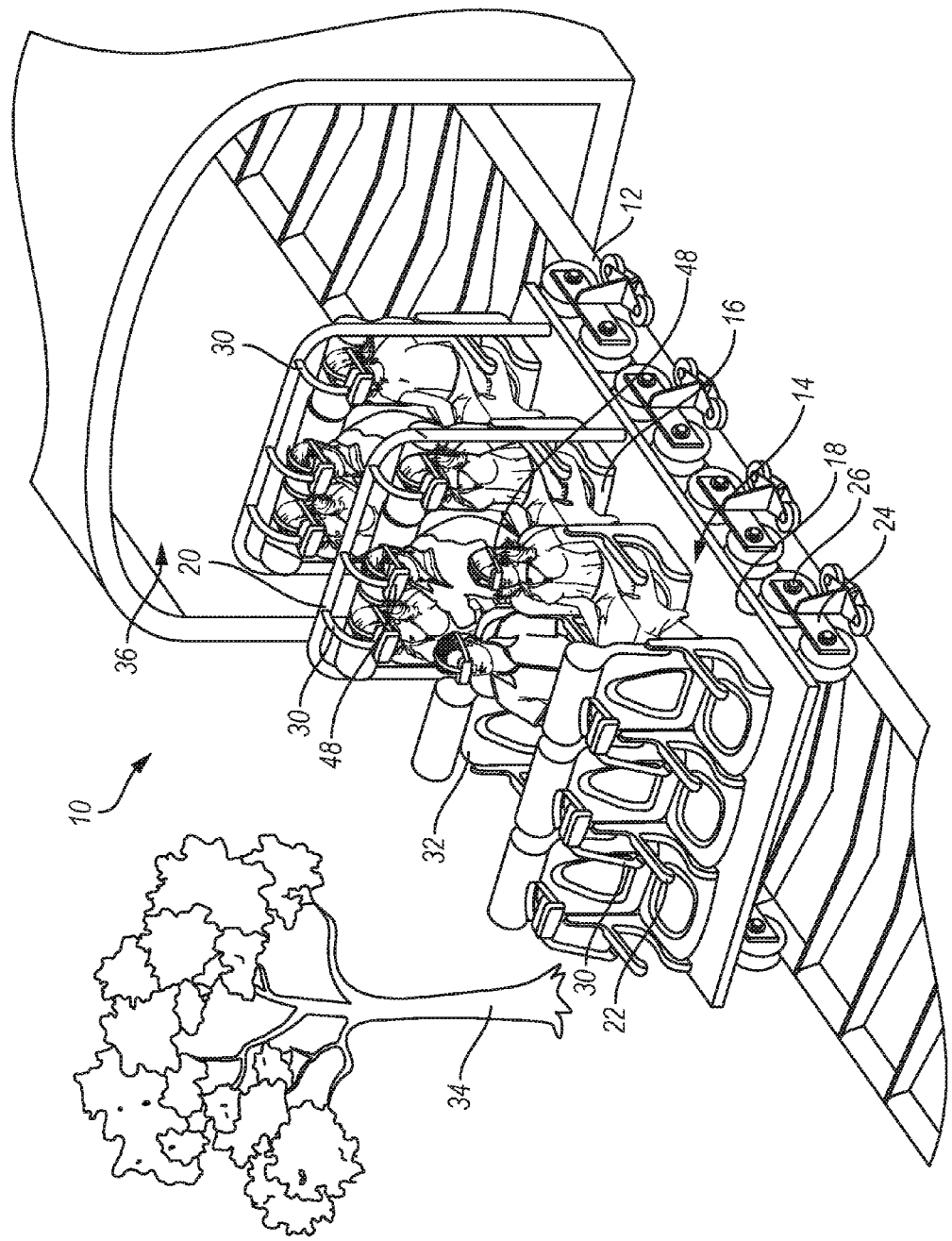
FIG. 1 is a perspective view of a ride attraction.
Figure 2:
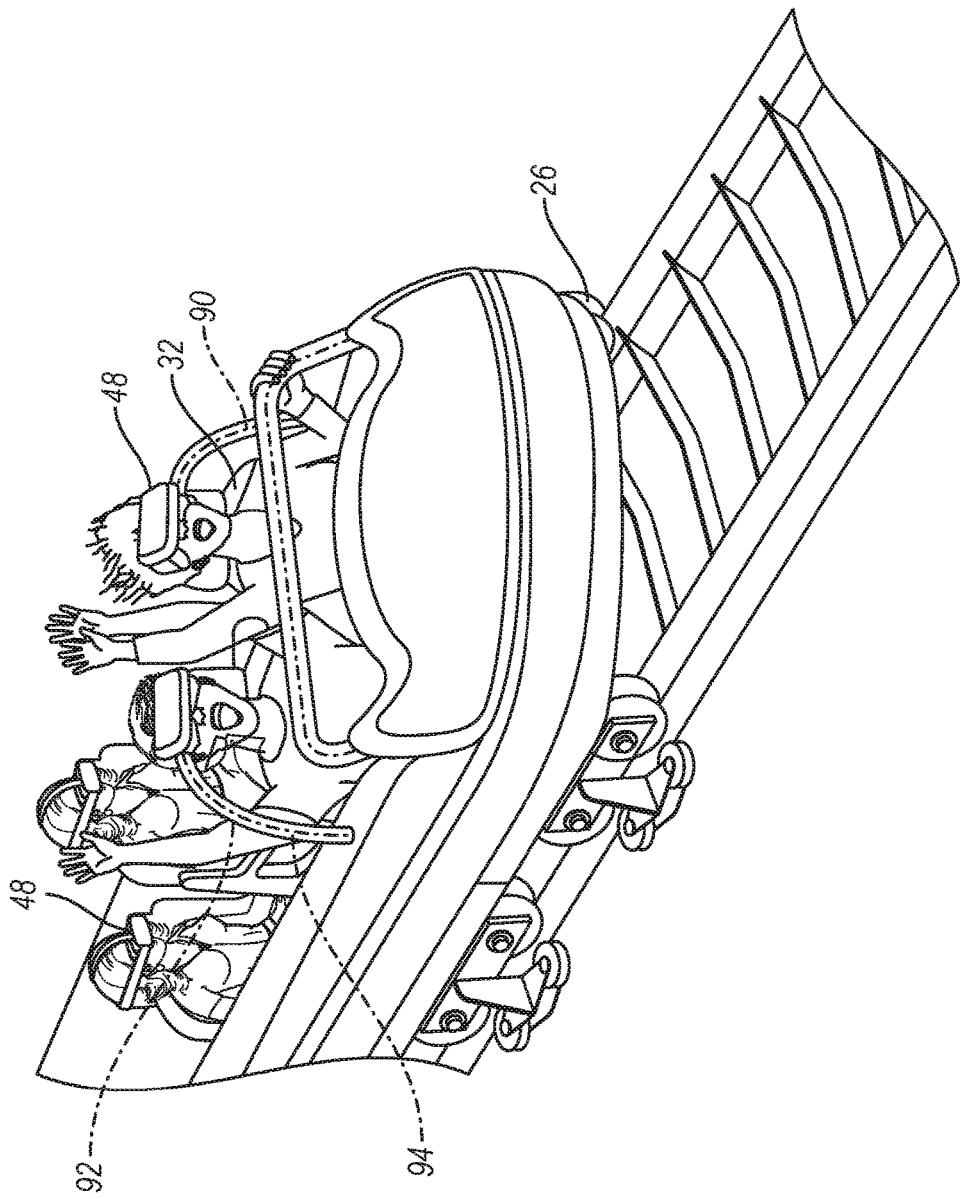
FIG. 2 is a perspective view of another ride attraction embodiment.

As shown in FIG. 1, a ride 10 has a path or track 12, with vehicles 14 movable along the track 12. Seats 16 of the vehicle are attached to a floor or seating platform 18 which optionally is supported on a motion base 26, such as a flight simulator type of motion base 26. The motion base 26 is attached to a chassis 24 typically having wheels which roll on a track, although the vehicle may optionally have wheels rolling on pavement, be suspended from an overhead track, float on water, or use other support techniques such as magnetic-levitation, hover, etc. The track 12 may be indoors to provide a dark ride, or be outdoors to provide a coaster type of ride, or include elements of both. Stationary, moving or animatronics figures, scenery and creative elements 34 may be provided along the track 12. The track 12 may also pass through un-themed space or dark space 36.

Figure 3:
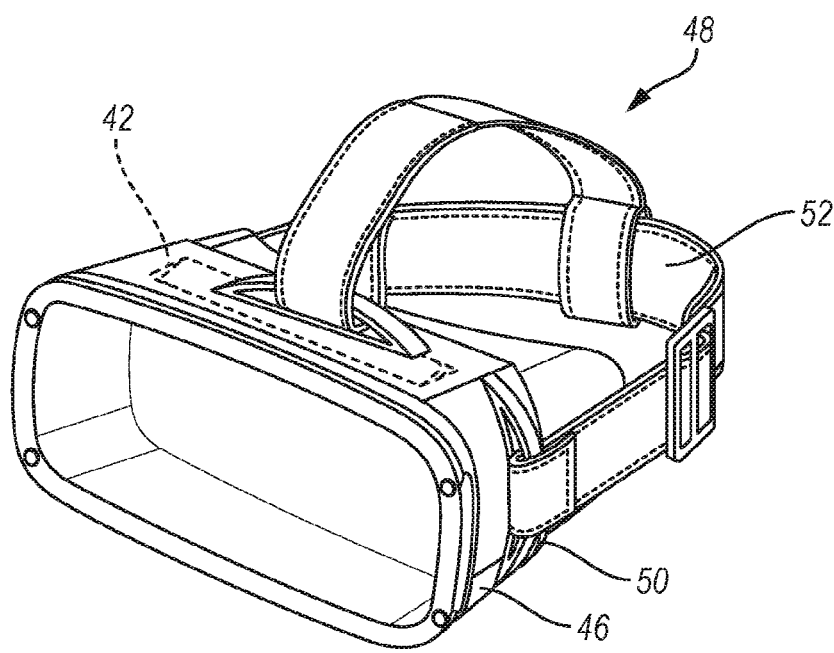
FIG. 3 is a perspective view of the headset shown in FIGS. 1 and 2.
Figure 4:
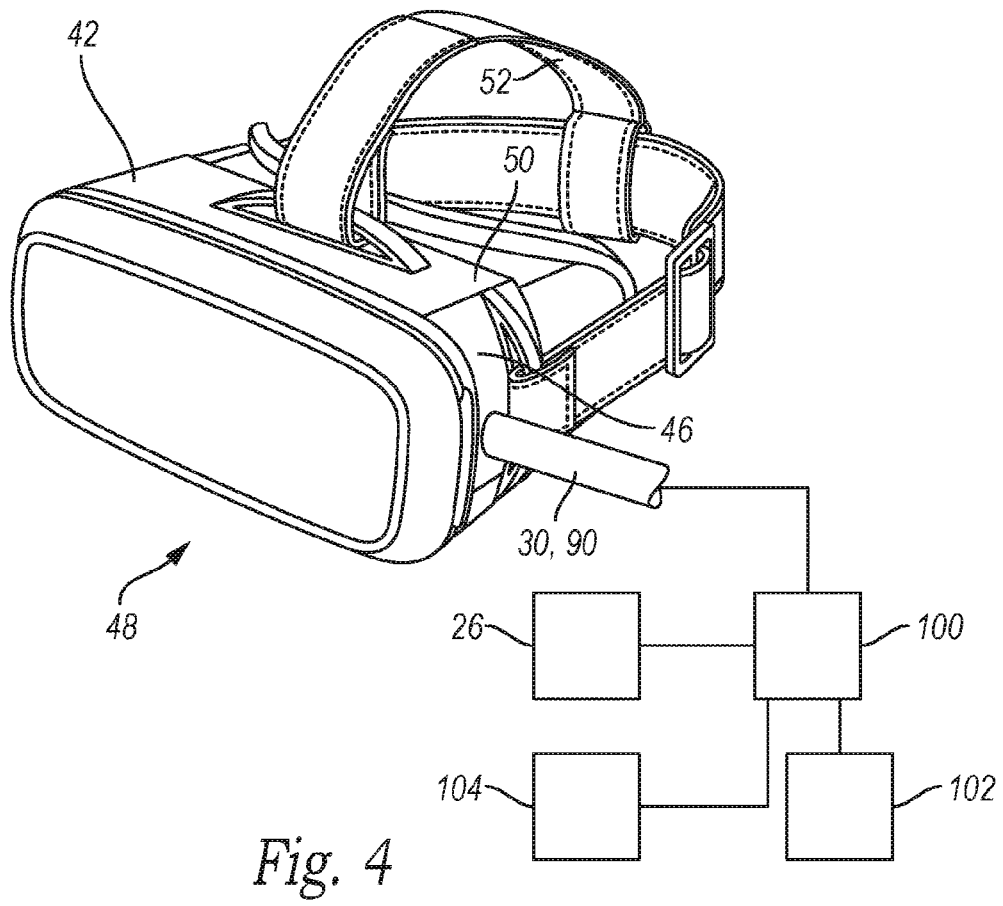
FIG. 4 is a perspective view of the headset shown in FIG. 3 and also schematically showing a ride control system.

As shown in FIGS. 3 and 4, a VR headset 48 is worn on the rider's head. The headset may be provided in the form of glasses, goggles, visor or a helmet, with FIG. 3 showing VR goggles' as one example.

The VR headset 48 may be supported on the upper end of an armature 30, with the lower end of the armature 30 attached directly or indirectly to the vehicle 14. The headset 48 may be permanently attached to the armature 30, which is permanently attached to the vehicle, in the sense that neither element is removed from the vehicle during ordinary use. The armature 30 may have electrical or optical cables used to drive the VR display.

For headsets having a separate display, an adapter 46 may be permanently attached to the body 50 of the headset, or the adapter may be a separate intermediate component. If used, the adapter 46 may having fittings which can quickly engage and disengage from the display 42, or a guide on the display 42. The adapter 46 is attached to a face frame 50 which is worn on the rider's face. Straps 52 or other head pieces adapted to fit on and/or around the rider's head hold the face frame 50 onto the rider's face. The adapter 46, if used, may be permanently attached to the face frame 50, or it may be a separate intermediate component, with different adapters designed to interface between different displays 42 and/or headsets 48. If riders buy and own their own headset 48, the adapter 46 may allow their headset 48 to attached to different types of displays 42 as may be used on different rides.

In use, each rider is provided with a headset 48. In some cases, riders may bring their own headset. The headset 48 may be adjustable for different size heads, or multiple sizes of headsets 48 may be used. The headset 48 may be a purely mechanical assembly, with all electronic components on the display 42 rather than on the headset 48. The headset 48 may accordingly be highly durable, resistant to shock, impact, liquid spills and splashing and other use and wear factors associated with heavy use in a theme park ride setting.

In operation, riders are seated in a vehicle 14. If a display 42 separate from the headset is used, the rider or a ride attendant attaches the display 42 to the headset 48. If the display 42 is integral with the headset 48, then of course no attachment step is needed. The display 42 may have plug or snap fittings to allow a quick and easy secure attachment and also allow the display to be quickly and easily released from the headset 48 at the end of the ride. Cams, magnets, and similar quick-release elements may be used. One or more alignment pins or wedges may be used to automatically align the display 42 onto the adapter 46, if used, or onto the face frame 50, with or without having a guide on the display 42.

The armature 30 may be provided with internal balancing springs adapted to support the weight of the headset 48. The headset 48 can therefore be heavier than a conventional VR eyeglass or goggles', while still being comfortable to the rider. The vehicle can also impart greater inertial forces on the rider, without the display becoming uncomfortable or getting displaced. The armature 30 may use an iso-elastic design of spring or elastic elements 92 and dampening elements 94 to allow the headset 48 to easily move with the rider's head, without exerting significant inertial forces or weight on the user's head or neck. Alternatively, the armature 30 may be a simple gooseneck lamp type of flexible tube. The armature 30 may include one or more adjustable spring elements and dampeners, and be adjusted to provide more or less lifting force and/or bending stiffness. Electrical, pneumatic or hydraulic elements may also be used for this purpose.

The headset is attached onto the upper end of the armature 30, optionally with a swivel or ball fitting. The lower end of the armature 30 may be attached to an arm rest 22 as show in FIG. 1. The lower end of an alternative armature 80 may be attached to a seat back 32, or an alternative armature 90 may be attached to a side wall, gunwale or top panel of the vehicle. In addition, the headsets may be suspended on a tether 60 attached to an overhead roll bar 20 or ceiling of an enclosed vehicle. Referring still to FIG. 1, although generally an armature 80 is provided at each seat of the vehicle, in some designs, some the armature 80 may be omitted at some seats. The headsets shown in FIGS. 3, 5 and 6 may be used with or without an armature 30.

As shown in FIG. 4, a computer controller 100 controls operation of the motion base 26, moving set pieces 104, movement of vehicles along the track via vehicle controllers 102, and optionally other functions such as sound and light effects, pre-show displays, etc. The controller 100 also receives sensor signals based on position or movement of the vehicle, and provides VR signals to drive the displays. The VR display media is synchronized with the program controlling movement of the motion base and/or vehicle movement. This allows for updates to replace the VR media and to re-program the motion profile to essentially create a new ride experience. Although explained here primarily in relation to a ride having vehicles moving along a pathway, the present concepts are also usable in other attractions, such as in theaters.

Figure 5:
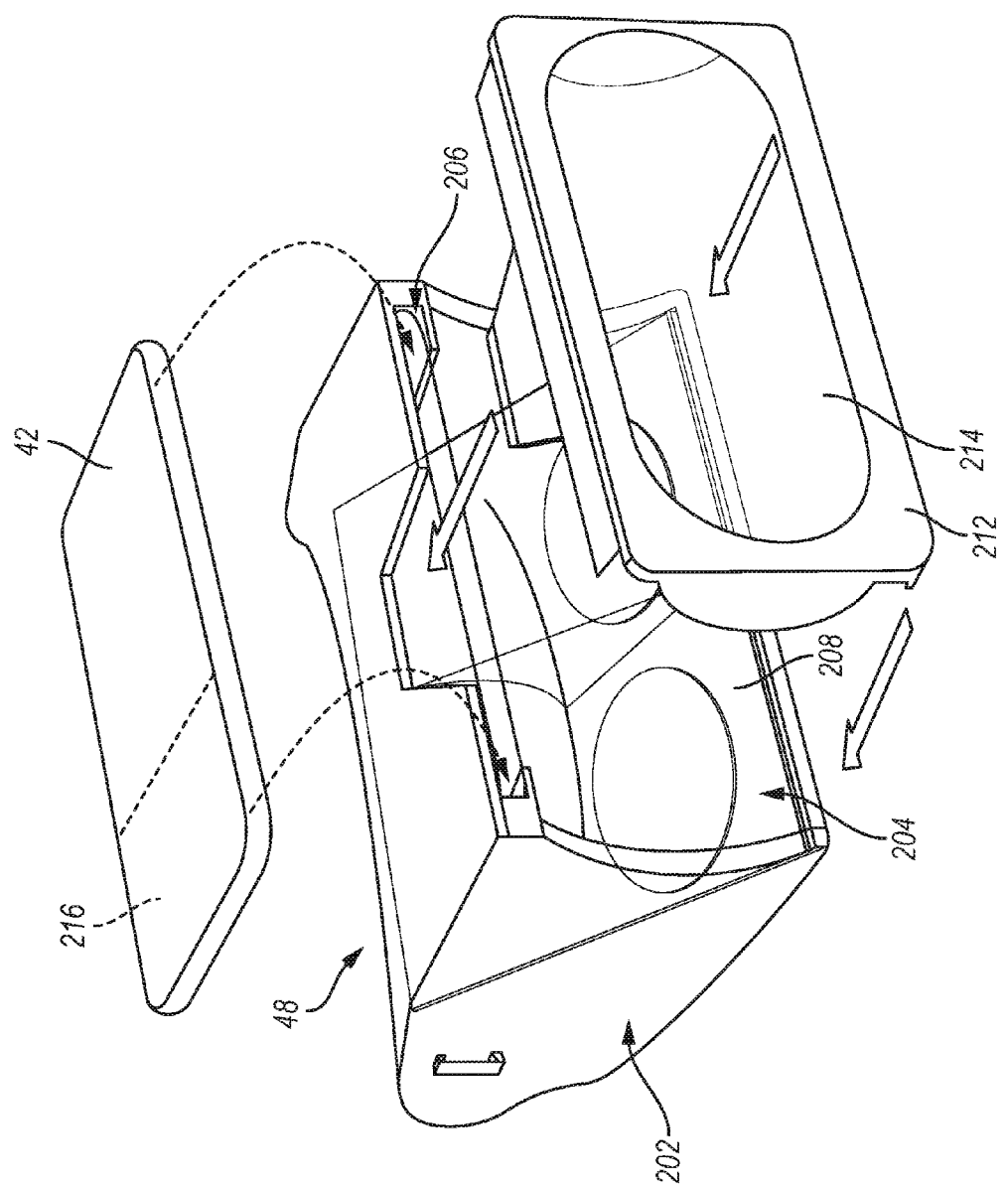
FIG. 5 is an exploded perspective view of the headset shown in FIGS. 1-4.

Turning now to FIG. 5, in the headset 48 the display 42 may be positioned within an opening or slot 206 at or near the top of the headset body 50. The display 42 may be a mobile phone owned by the rider. Alternatively, the display 42 may be ride-dedicated display with or without image processing circuitry. The ride-dedicated-display may be removable from the headset 48, or it may be a non-removable permanent part of the headset 48. In cases where the display 42 does not have its own image processing circuitry, image processing is performed remotely and corresponding image data is transmitted to the display 42 wirelessly or via a wired connection through a cable or armature 30 connected to the headset 48.

Referring still to FIG. 5, the headset 48 may have a front frame 212 which can be separated from the headset body 50, to install and/or remove the display 42, or to otherwise provide access to the interior of the headset body 50, e.g., for cleaning, adjustment, etc. A transparent window 214 is provided in the front frame 212. The window may be glass or plastic. The window 214 may optionally be switchable from fully transparent to fully opaque, using liquid crystal diode glass or an equivalent. In this case, the switching from transparent to opaque may be controlled by the controller 100 or the computer in the headset itself. In some designs the front frame 212 is omitted and the window is provided in the front surface or wall of the display body 50.

Figure 6:
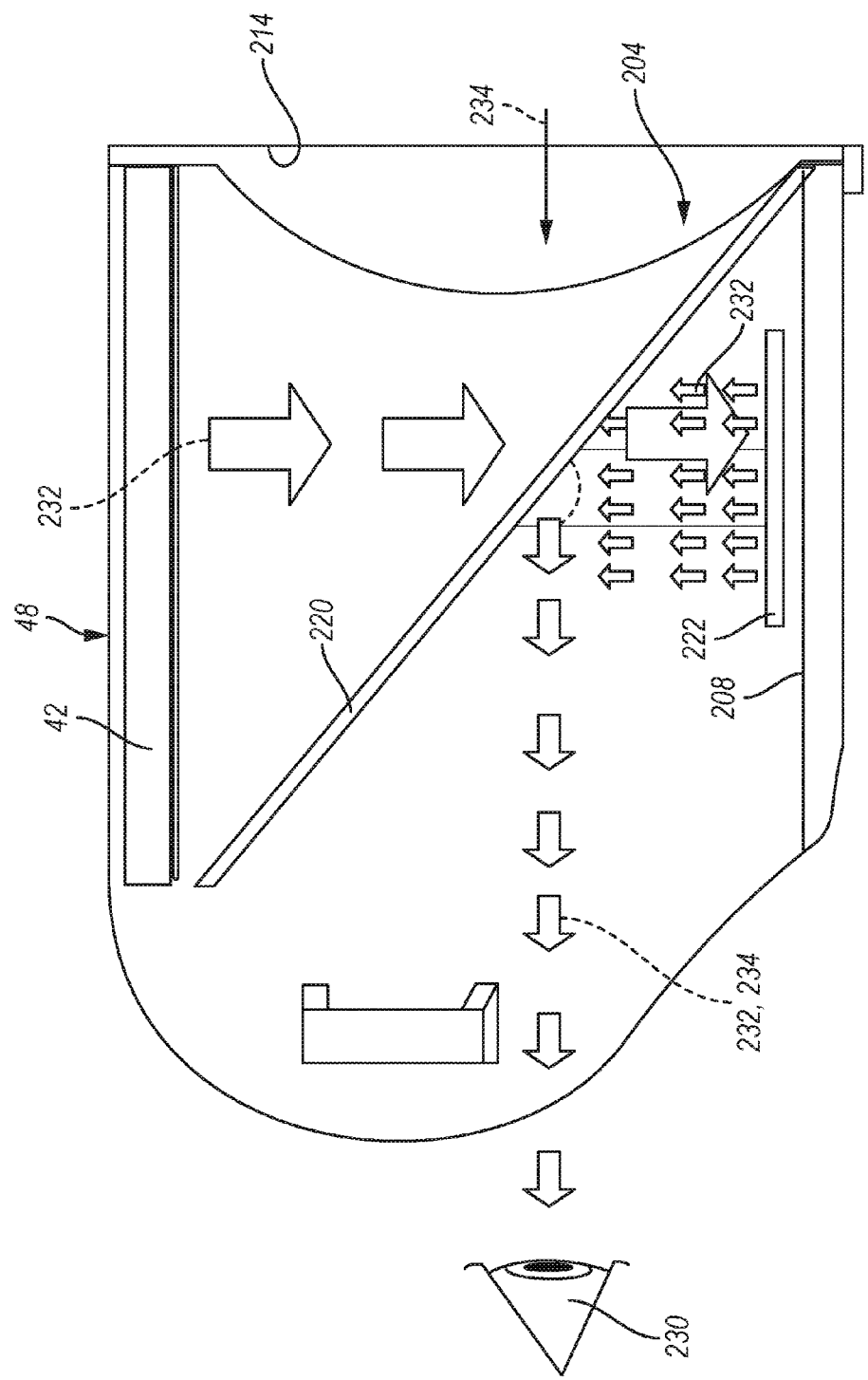
FIG. 6 is a section view of the headset of FIG. 5.

As shown in FIG. 6, concave reflectors 222 are supported at or near the bottom of the headset body 50, on the floor 208 of the headset body 50. The reflectors 222 are aligned with the display 42. The reflectors are provided to reflect light from the display 42.

A beam splitter 220 is positioned between the reflectors 222 and the display 42. The beam splitter 220 allows 50% of the light 232 to pass through, and allows 50% of the reflected light 232 to be reflected into the eye 230. The beam splitter 220 may be oriented at an acute angle to the display 42, for example 30 to 50°, or 45°. The beam splitter may be glass or plastic, such as polycarbonate, in the form of a sheet or film. A battery 216 or other power supply is provided in the display 42 or elsewhere in the headset 48 to power the electrical components of the headset.

In some designs the window and the display may be combined, with the beam splitter and the reflectors omitted. In these designs the transparent window is replaced with a transparent display which displays virtual images and which also allows light from real world objects to pass through the display, with or without changing direction.

Referring to FIG. 6, in use, light 232 from the display image on the display 42 projects down through the beam splitter 220 onto the reflectors 222. The reflectors reflect display image light 232 back up the bottom side of the beam splitter 220, which redirects the light 232 rearward to the eyes 230 of the rider. At the same time, light 234 from the real world (the ride scenery, set pieces, etc.) passes through the window 214 and through the beam splitter to the eyes of the rider. This provides an augmented reality experience as the rider sees both the display images and the real-world images. The display images may be provided as an overlay onto the real images. The display images may be changed via software, to provide different ride experiences to different riders, spatially and/or temporally.

If used, the two concave reflectors 222 may provide a large circular field of view, offering about 960×1080 pixels per eye (depending on the screen resolution). The pair of concave reflectors 222, or an equivalent lens systems, may be oriented slightly inwardly to compensate for smaller display sizes. In the example shown, the display 42 is located slightly beyond the focal point of the mirror/lens system, allowing the virtual reflected image to be magnified, and projecting the image further away from the viewer, for example at a position about 4 to 5 meters away from the user. FIGS. 5 and 6 show a design using two concave mirrors 222 that are 75 mm in diameter with a 100 mm focal point, and true chrome/silver reflectors. In an alternative design, a 75 mm diameter convex lens with a focal length around the 150 mm range, placed on top of a round mirror.

Software may be used to render two cameras side by side with no distortion using known techniques. If the lens/mirror is larger than half the size of the screen of the display 42, the lens/mirrors is rotated inwardly to take advantage of the full resolution. This angle of rotation accounted for via software, by adding the rotational offset to both virtual cameras. The field of view can be aligned by measuring a known shape in the real world, and recreating it in the virtual world. Using this set of virtual cameras rendered to each eye, objects can be shown at any focal point depth within a range of 3-6 meters.

The virtual cameras in the software follows a predetermined path of the ride system, allowing the rider wearing the headset to perceive accurate parallax and location tracking. To get more accurate positional tracking, the x/y/z location of the ride vehicles may be obtained. Using this data, if a ride vehicle stops or starts up again, the virtual camera will react accordingly. Getting other vehicle positions can also allow users to see other holographic objects to be tracked on other ride vehicles.

The headset 48 may be provided with an initial rotation calibration, to indicate which direction is toward the front of the vehicle. Alternatively, the headset may include a magnetic compass, or the headset may receive the positional data from an external tracker, for easier calibration and head rotation tracking.

During certain intervals of the ride or theater presentation, the window 214 may change from transparent to opaque. When the window is opaque, light 234 is blocked and the rider sees only the images 232 from the display 42, providing a virtual reality experience. The window 214 may be changed to opaque during intervals when the ride vehicle is travelling through dark or un-themed areas, for example between sets or scenes of the ride facility. The virtual reality images may include displaying virtual characters or objects in or on the vehicle, or travelling alongside or in front of the vehicle, as well as scenery and fixed or moving set pieces and/or action figures. The capability of displaying virtual reality images to the rider may also allow for simplified themed elements (e.g., scenery, set pieces, etc.) as visual details can be added virtually, eliminating the need for all visible ride or show details to be physically created in the real world.

To reduce the amount of data communication needed, the headset 48 may have memory, processing, and graphics capability, either in the display 42, or elsewhere in the headset. In this, all data needed to drive the display 42 (and optionally to switch the window 214) is stored in the headset 48. The headset may have sensors which detect its location or position along the ride path, to allow the headset 48 to coordinate the displayed images or sequences with the vehicle movement and/or position.

As will be apparent to the those skilled in the art, existing ride attractions may be readily upgraded to an augmented reality ride attraction via the addition of the headsets described above, optionally along with the controllers and sensors described.

Thus, novel systems and methods have been shown and described. Various changes and substitutions may of course be made, without departing from the spirit and scope of the invention. The invention, therefore, should not be limited, except by the following claims and their equivalents.

The invention claimed is:

1. A ride attraction, comprising:
a ride vehicle moveable along a pathway;
a seat in the ride vehicle for accommodating a rider;
a headset wearable on the head of the rider, with the headset having a headset body, a front window in the headset body, a display positioned above the window and a reflector below the window and aligned with the display, and a beam splitter in the headset body between the display and the reflector, with the beam splitter oriented at an acute angle to the plane of the window;
the display and the ride vehicle linked to a computer controller for displaying reflected virtual images to the rider, and controlling movement of the ride vehicle, with light of the real world images travelling in a straight line through the headset to the eyes of the rider, and light of the virtual images generated by the display impinging on a first side of the beam splitter, passing through the beam splitter to the reflector, reflecting off of the reflector, impinging on a second side of the beam splitter and reflecting off of the second side of the beam splitter to the eyes of the rider.

2. The ride attraction of claim 1 with the headset further including a front frame attached to a headset body, and with the window on the front frame, and with the display positionable into the headset and removable from the headset by the rider.

3. The ride attraction of claim 1 with the ride vehicle further including a motion base linked to the computer controller for moving the seat in synchronization with the virtual images.

4. The ride attraction of claim 1 with the headset mounted to the ride vehicle on an adjustable mounting arm.

5. The ride attraction of claim 1 wherein the window is switchable between a transparent mode and an opaque mode.

* * * * *